United States Patent
Gellerich et al.

(10) Patent No.: US 8,863,101 B2
(45) Date of Patent: *Oct. 14, 2014

(54) COMPILER GENERATOR

(75) Inventors: Wolfgang Gellerich, Boeblingen (DE); Andreas Krebbel, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1361 days.

This patent is subject to a terminal disclaimer.

(21) Appl. No.: 12/331,620

(22) Filed: Dec. 10, 2008

(65) Prior Publication Data

US 2010/0146494 A1 Jun. 10, 2010

(51) Int. Cl.
*G06F 9/45* (2006.01)
*G06F 9/44* (2006.01)

(52) U.S. Cl.
CPC ........................................ *G06F 8/37* (2013.01)
USPC ........... 717/143; 717/141; 717/151; 717/153; 717/156

(58) Field of Classification Search
USPC ........................................ 717/114–161, 170
See application file for complete search history.

(56) References Cited

U.S. PATENT DOCUMENTS

| | | | |
|---|---|---|---|
| 3,700,873 A | | 10/1972 | Yhap |
| 4,712,189 A | | 12/1987 | Mohri |
| RE33,706 E | | 10/1991 | Mohri |
| 5,119,465 A | * | 6/1992 | Jack et al. ..................... 717/137 |
| 5,339,419 A | * | 8/1994 | Chan et al. ................... 717/147 |
| 5,487,147 A | | 1/1996 | Brisson |

(Continued)

FOREIGN PATENT DOCUMENTS

EP  1307828 B1  9/2004

OTHER PUBLICATIONS

Gertjan van Noord et al., An Extendible Regular Expression Compiler for Finite-State Approaches in Natural Language Processing, Springer-Verlag Berlin Heidelberg 2001, LNCS 2214, pp. 122-139.*
Neil D. Jones, An introduction to partial evaluation, ACM vol. 28 Issue 3, Sep. 1996, pp. 480-503.*

(Continued)

*Primary Examiner* — Satish Rampuria
(74) *Attorney, Agent, or Firm* — Cantor Colburn LLP; Steven Bennett

(57) ABSTRACT

A system including an input compiler that receives a unified input description containing syntax rules for both regular and context-free expressions and interspersed code, the first compiler configured to translate the unified input description into a common internal representation is disclosed. The system also includes a regular expression checker, a context-free expression checker, a code checker and a second compiler coupled to the code checker.

9 Claims, 4 Drawing Sheets

(56) References Cited

U.S. PATENT DOCUMENTS

| | | | |
|---|---|---|---|
| 5,613,117 A * | 3/1997 | Davidson et al. | 717/144 |
| 5,721,959 A | 2/1998 | Nakamura et al. | |
| 5,826,089 A * | 10/1998 | Ireton | 717/146 |
| 5,896,521 A | 4/1999 | Shackleford et al. | |
| 6,046,951 A | 4/2000 | El Hajji | |
| 6,378,126 B2 * | 4/2002 | Tang | 717/143 |
| 6,427,234 B1 | 7/2002 | Chambers et al. | |
| 6,983,456 B2 | 1/2006 | Poznanovic et al. | |
| 6,990,442 B1 | 1/2006 | Davis | |
| 7,076,772 B2 * | 7/2006 | Zatloukal | 717/147 |
| 7,188,168 B1 * | 3/2007 | Liao | 709/224 |
| 7,315,883 B2 | 1/2008 | Fair et al. | |
| 7,350,193 B2 | 3/2008 | Belov et al. | |
| 2004/0143814 A1 * | 7/2004 | de Jong | 717/104 |

OTHER PUBLICATIONS

Alfred V. Aho et al., Awk—A Pattern Scanning and Processing Language, Software—Practice and Experience, vol. 9. 261-279 (1979), John Wiley & Sons, Ltd, pp. 267-279.*

Benjamin C. Brodie et al., A Scalable Architecture for High-Throughput Regular-Expression Pattern Matching, IEEE, 2006, pp. 1-12.*

W. Gellerich et al., The GNU 64-bit PL8 Complier: Toward an open standard environment to firmware development, IBM J. Res & Dev, May/Jul. 2004, vol. 48, No. 3/4 pp. 543-554.

Edelsohn et al., Contributions to the GNU Compiler Collection, IBM Systems Journal, 2005, vol. 44, No. 2, pp. 259278.

* cited by examiner

COMPILER GENERATOR

BACKGROUND

The present invention relates to computing systems, and more specifically, to the generation of source code and executable code from formal descriptions.

For many applications, the structure of data to be processed can be described mathematically using formal languages like regular expressions, and context-free grammars. Such data descriptions may find application in compiler construction. In addition, such structures may be used in manipulating or evaluating mathematical expressions and in programs with general text input such as computer games and search engines. Such expressions may also be used in cache and network protocols.

Computer programs analyzing such structured data can be generated automatically from the formal description. Such tools are typically referred to as compiler generators. A compiler-compiler or compiler generator is a tool that creates a scanner, parser, interpreter, or compiler from some form of formal description. The earliest and still most common form of compiler-compiler is a parser generator, whose input is a grammar (usually in Backus-Naur Form (BNF)) of a programming language, and whose generated output is the source code of a parser.

The ideal compiler compiler takes a description of a programming language and a target instruction set architecture, and automatically generates a usable compiler from them. In practice, the state of the art has yet to reach this degree of sophistication and most compiler generators are not capable of handling semantic or target architecture information.

Compiler generators typically include scanner generators and parser generators and have been available, in simple forms, since the late 1960's. A scanner generator typically processes regular expressions while parser generators process context free grammars.

In computing, regular expressions provide a concise and flexible means for identifying strings of text of interest, such as particular characters, words, or patterns of characters. Regular expressions (abbreviated as regex or regexp, with plural forms regexes, regexps, or regexen) are written in a formal language that can be interpreted by a regular expression processor, a program that either serves as a parser generator or examines text and identifies parts that match the provided specification. In formal language theory, a context-free grammar (CFG) is a grammar in which every production rule is of the form V→w where V is a single non-terminal symbol, and w is a string of terminals and/or non-terminals (possibly empty). The term "context-free" expresses the fact that non-terminals can be rewritten without regard to the context in which they occur. A formal language is context-free if some context-free grammar generates it. Context-free grammars play a central role in the description and design of programming languages and compilers. They are also used for analyzing the syntax of natural languages.

The regular expressions and context free grammars may optionally contain interspersed C code fragments. In sum, the compiler generator typically, from the input of the scanner generator and the parser generator (with the additional C code) generates source code (as an executable) that is later translated by a compiler.

SUMMARY

According to one embodiment of the present invention, a system that includes a scanning and parsing module that receives a unified input description containing syntax rules for both regular and context-free expressions and interspersed code, the first compiler configured to translate the unified input description into a common internal representation. The system also includes a regular expression checker coupled to the input compiler configured to check regular expressions in the common internal representation and a context-free expression checker coupled to the regular expression checker configured to check context-free expressions in the common representation. The system also includes a code checker coupled to the context-free expression checker configured to check the interspersed code and a code optimizer coupled to the code checker.

Another embodiment of the present invention is directed to a system that includes a scanning and parsing module that receives a unified input description containing syntax rules for both regular and context-free expressions and interspersed code, the first compiler configured to translate the unified input description into a common internal representation; an expression checker coupled to the input compiler configured to check expressions in the common internal representation; a code checker coupled to the expression checker configured to check the interspersed code; and a code optimizer coupled to the code checker.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
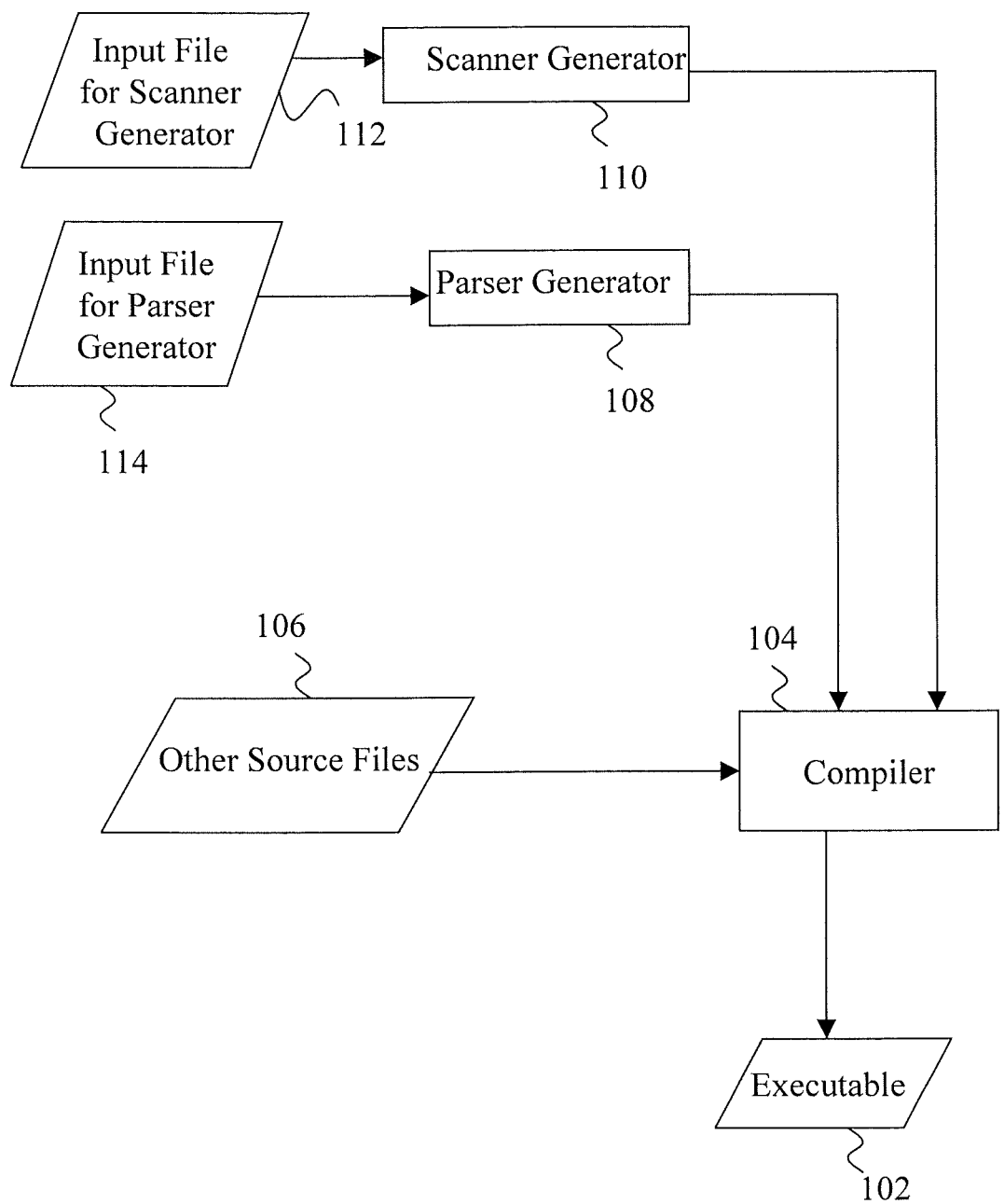
FIG. 1 shows a prior art compiler generator.

With reference now to FIG. 1, an example of a prior art compiler generator system is shown. The compiler generator system generates source code in a programming language that forms a compiler 102. One example of such a programming language is the "C" language. Of course, other types of languages, such as, for example, C++, Ada, or Java can be used as well. The compiler generator system includes a compiler 104 that generates the compiler 102. The compiler 104 may be a pre-existing compiler written for the particular language being utilized.

The compiler 104 receives pre-existing source files from a source file store 106 as well as a parser source code created by the parser generator 108 and scanner source code created by the scanner generator 110. The scanner generator 110 receives a scanner input file 112 and the parser generator 108 receives a parser input file 114. The scanner source code created by the scanner generator 110 includes semantic actions written in the particular programming language (for example, C) and may include errors that are not yet reported. The parser source code created by the parser generator 108 includes semantic actions written in the particular programming language (for example, C) and may contain errors not yet reported. The compiler 104 receives the parser source code and the scanner source code and creates the executable compiler 102. This executable compiler may include errors that track from the errors in the parser and scanner source codes, none of which have been reported.

All compiler generators, such as the compiler generator system shown in FIG. 1, accept an input language that consists of a formal description of the formal language. The system then translates this description into some programming language source code, e.g. written in C. In almost all cases the formal description is interspersed with source code fragments that the system will copy into the generated source code. This interspersed code is intended to perform some actions while the code generated from the formal description runs.

Consider the following code segment:

```
ASM_param: char_string '(' expression ')'
   {
      tree constraint_list= make_node (TREE_LIST);
      TREE_VALUE (constraint_list)= $1;
      $$= make_node (TREE_LIST);
      TREE_PURPOSE ($$)= constraint_list;
      TREE_VALUE ($$)= $3;
   }
| /* epsilon */
   { $$= NULL_TREE; }
;
```

The lines enclosed in curly braces { } are C code and are copied by the system without any checking. Any problems introduced here will only be found later when the compiler 104 translates these lines in the context of the generated parser, or they may remain undetected.

Without such interspersed code, the generated program would only be able to report whether some input presented to it is correct in terms of the formal description. If the formal description were, for example, the programming language PL8, then a generated "compiler" without interspersed code would only be able to tell whether a text is a valid PL8 program, or not. However, to also trigger the generation of machine code, interspersed code is necessary. This applies to almost all applications of compiler generators, and all such systems support the usage of such interspersed code.

The C code is, however, not copied verbatim; the pseudo-variables having names beginning with a dollar sign $ are replaced by the compiler generator as part of the copying step. These variables are named "attributes" in the context of compiler-generation and are of greatest importance. They are used to accumulate values determined while analyzing input data (here: PL8 program source code) and are further used to communicate these values between different syntax rules. All compiler generators have some notation for attributes; the usage of names starting with a $ symbol, however, is specific to the generators yacc, bison and their derivates. Because the attributes are involved in operations just like normal variables are, there needs to be data types associated with these attributes. Unfortunately, correctness checks are difficult for several reasons. First, the system checks syntax rules and related declarations. The system does not, however, have any understanding of how to check the interspersed code. Since the interspresed code are fragments of C code, it cannot be checked during the generation step because they do not yet appear in their final context. In addition, the system does not check whether the usage of the attributes within the interspersed code is correct. Further, compiler 104, which later translates the source code generated by the compiler generator(s), does not have access to or an understanding of the syntax rules and attributes found in the input description.

In addition, the parser generator 108 usually creates some kind of implementation for the attributes. Given that attributes for recursive syntax rules are usually managed using a stack, generators often implement attribute values in a way that requires only one size for all stack entries, independent of possible attribute values and attribute data types. In the case of yacc and bison for example, all attribute types are summarized as a C union type. This prevents any type checking by the compiler.

Embodiments of the present invention may solve some or all of these problems and supports type checking for interspersed code, including correctness checks for attributes.

The disadvantages of the state of the art concern several important areas such as productivity of developers using compiler generators, execution time needed by the compiler generators, efficiency of the generated code, and last not least the reliability of the final product. The problem is that a compiler generator cannot check the interspersed code. Also, many applications require to associate so-called "data attributes" with some elements of the formal description. These data attributes are assigned values and they are read by the interspersed code. Current compiler generators cannot do any checking here. In particular, no type checking is possible for attributes. Also, the compiler generator cannot check the interspersed code itself, and it cannot check its interactions with attributes.

Some of the errors a developer can make when writing interspersed code and in particular when passing values around between different rules using attributes remain undetected, thus yielding erroneous code. Note that this kind of problems occur in practice. Some other kinds of problems are detected when a compiler compiles the output of the compiler generator. In this case, the compiler's error messages relate to the output of the compiler generator and need to be mapped back to the source lines found in the compiler generators' input. This requires additional effort. If the mapping is not done precisely, it may cost a lot of work to locate the error in the input file. Fixing such a bug may be time consuming as it is necessary to first run the compiler generator and then compile the generated code again. For the combination that is state of the art in Linux and GCC, the situation is even worse because a typical setup involves not only one compiler and one compiler generator, but no less than two different compiler generators (one scanner generator, processing regular expressions, and one parser generator processing LALR(1) grammars) which interact which each other, and also interact with the compiler. Even worse, some errors may remain undetected at all and make it into the final product.

Figure 2:
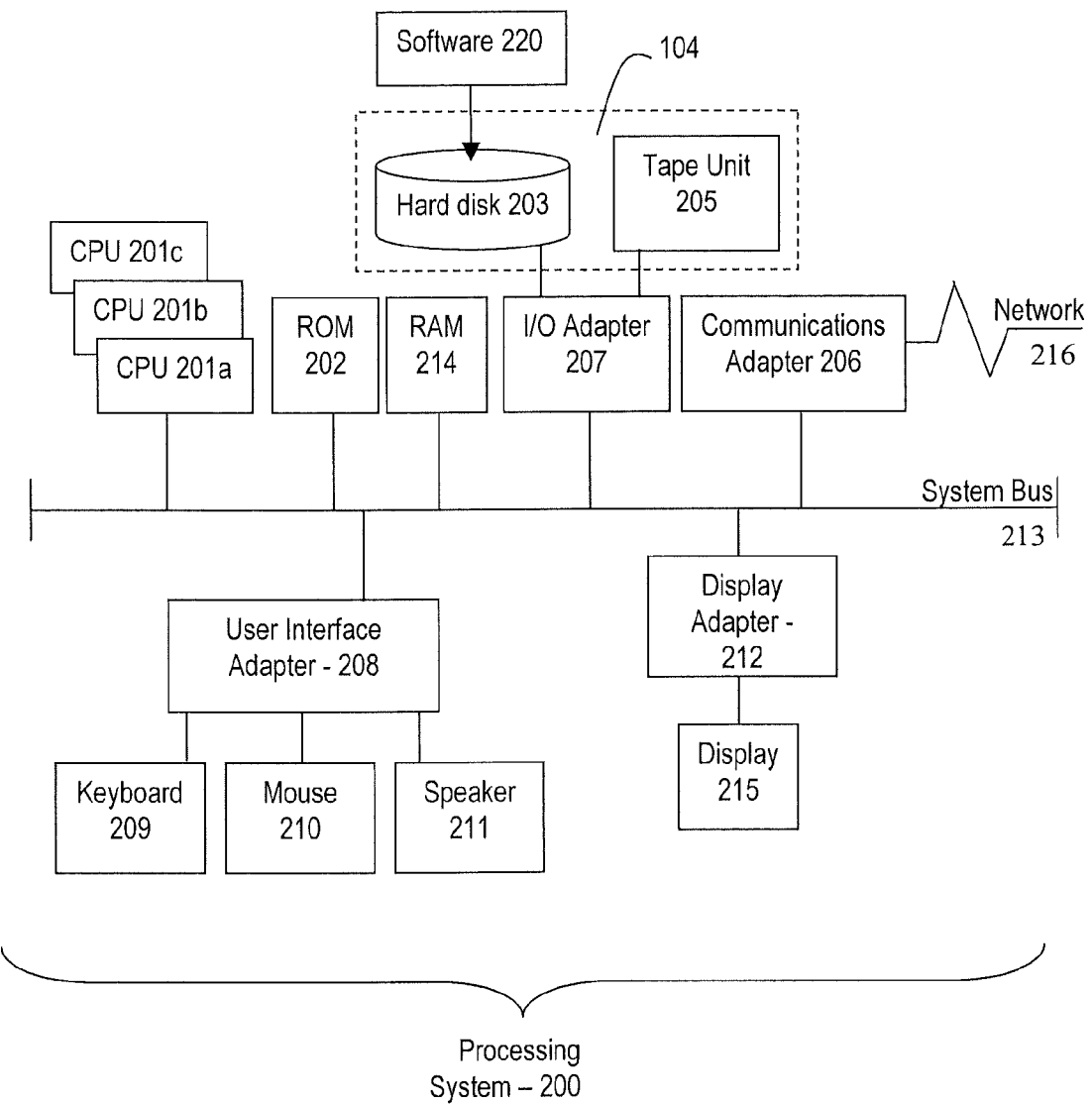
FIG. 2 shows a system upon which embodiments of the present invention may be operated.

FIG. 2 shows an embodiment of a computing system 200 for implementing the teachings herein. In this embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

The system may also include an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. In one embodiment, the mass storage may include or be implemented as a database for storing enterprise architecture information. A network adapter 206 interconnects bus 213 with an outside network 216 enabling data processing system 200 to communicate with other such systems. A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 213 via user interface adapter 208 and display adapter 212. A keyboard 209, mouse 210, and speaker 211 all interconnected to bus 213 via user interface adapter 208, which may include, for example, a Super I/O chip integrating multiple device adapters into a single integrated circuit.

Thus, as configured in FIG. 2, the system 200 includes processing means in the form of processors 201, storage means including system memory 214 and mass storage 204, input means such as keyboard 209 and mouse 210, and output means including speaker 211 and display 215. In one embodiment, a portion of system memory 214 and mass storage 204 collectively store an operating system such as the AIX® operating system from IBM Corporation to coordinate the functions of the various components shown in FIG. 2.

It will be appreciated that the system 200 can be any suitable computer or computing platform, and may include a terminal, wireless device, information appliance, device, workstation, mini-computer, mainframe computer, personal digital assistant (PDA) or other computing device.

Examples of operating systems that may be supported by the system 200 include Windows 95, Windows 98, Windows NT 4.0, Windows XP, Windows 2000, Windows CE, Windows Vista, Macintosh, Java, LINUX, and UNIX, or any other suitable operating system. Of course, the operating systems listed above may be executing in a virtualized environment.

The system 100 also includes a network interface 116 for communicating over a network. The network can be a local-area network (LAN), a metro-area network (MAN), or wide-area network (WAN), such as the Internet or World Wide Web.

Users of the system 200 can connect to the network 116 through any suitable network adapter 106, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

As disclosed herein, the system 200 includes machine readable instructions stored on machine readable media (for example, the hard disk 204) for capture and interactive display of information shown on the screen 215 of a user. As discussed herein, the instructions are referred to as "software" 220. The software 220 may be produced using software development tools as are known in the art. The software 220 may include various tools and features for providing user interaction capabilities as are known in the art.

As discussed above, there are many problems that may exist related to current compiler generators. Embodiments of the present invention are related to new systems and methods that improve the flow of information in a compiler generator. In particular, embodiments of the present invention may utilize one common internal representation (IR) that contains complete information. The input files for both the parser and scanner generators of the prior art to be translated into a single IR. In one embodiment, the IR may include information on syntax rules, attributes and attribute data types, and interspersed C code and its usage of attributes. This may allow for effective checks at the interface between syntax rules and interspersed C code. In one embodiment, an executable compiler may be generated from the IR.

Stated alternatively, embodiments of the present invention may organize all processing steps around one common internal representation that contains all relevant information. One difference from the prior art is that the prior art included several steps which all had their own internal representation. And none of those internal representations contained full information, thus no step was able to perform full error checking.

The input description according to one embodiment of the present invention is a new kind of input language that consists of all elements found in a programming language, for example, C, plus some additional constructs that implement the rules needed to describe formal languages. These additional constructs are fully integrated into the programming language. The tool implementing the invention will also be more efficient than state-of-the-art compiler generators because intermediate text representation is omitted.

It should be understood that, while the programming language C has been used in examples herein, the teachings of the present invention may applied to any programming language. For example, the teachings may be applied to the C++, Ada and Java programming languages.

Figure 3:
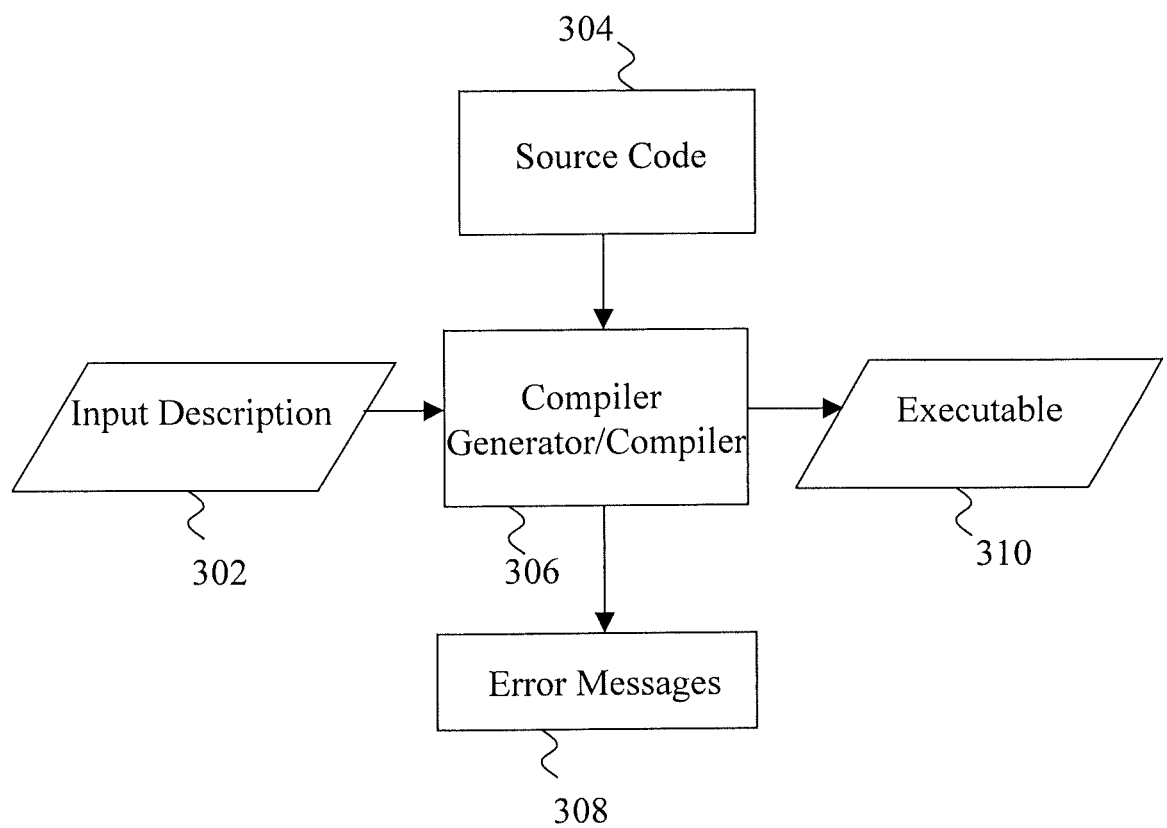
FIG. 3 shows a data-flow diagram of one embodiment of the present invention.

FIG. 3 shows a data flow diagram for a compiler generator 300 according to an embodiment of the present invention. The input consists of a unified input description 302 that includes the syntax rules and their interspersed code. In one embodiment, the syntax rules will include both regular expressions and context free grammars. Accordingly, the input description 302 may take the form of a coalesced version of the prior art scanner and parser generator input files. Optionally, the input may also consist of other source code 304 and libraries that do not need a formal language description. The input is processed by a compiler generator/compiler 306 that is an implementation of an embodiment of the present invention. The compiler generator/compiler 306 produces executable code 310 if the input was correct. Otherwise, the generator/compiler 306 generator appropriate error messages 308.

Figure 4:
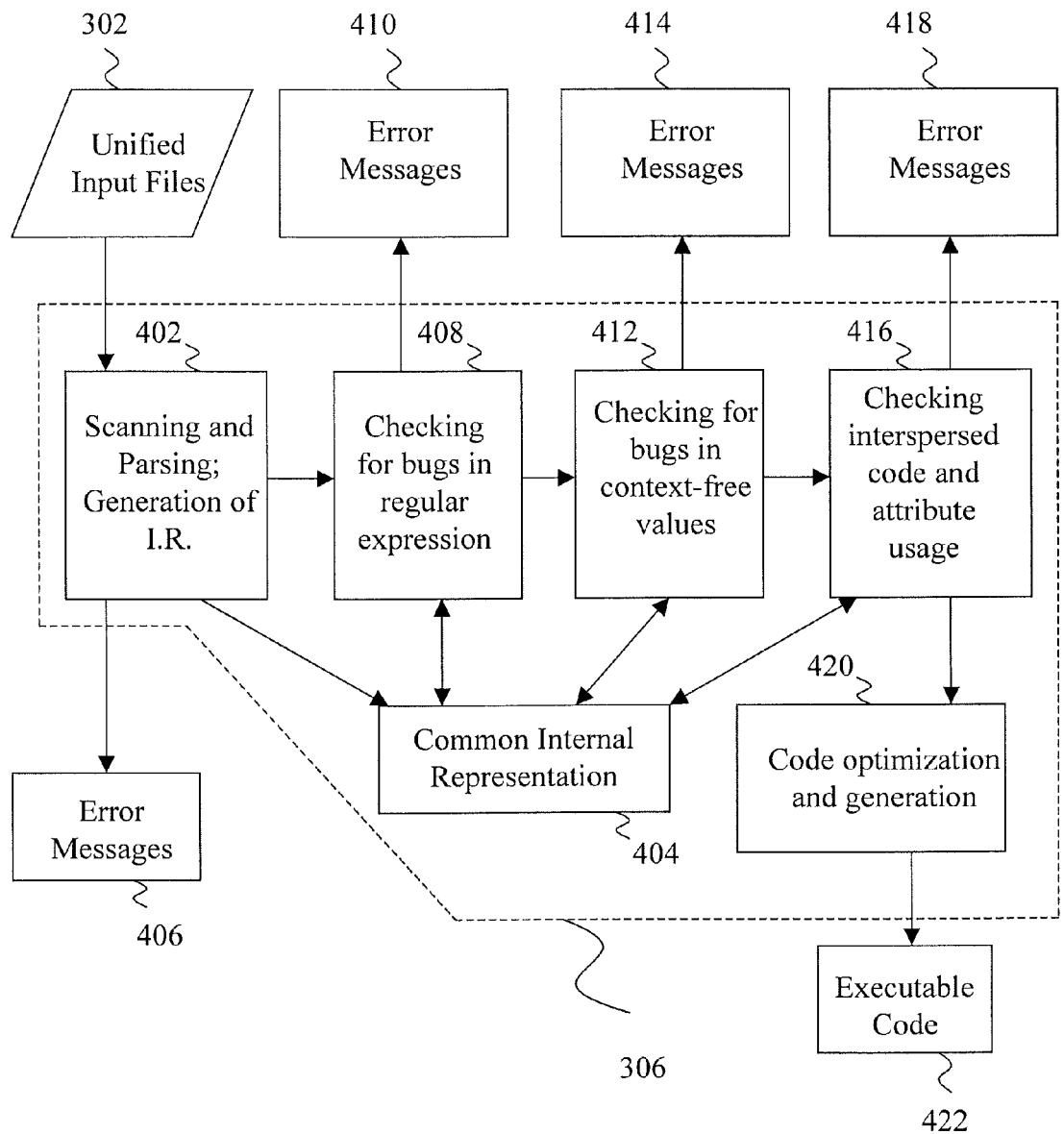
FIG. 4 shows a more detailed depiction of the compiler generator/compiler shown in FIG. 3.

FIG. 4 shows a more detailed version of the system shown in FIG. 3. In particular, FIG. 4 contains a more detailed version of the compiler generator/compiler 306 of FIG. 3. The compiler generator/compiler 306 includes an appropriated compiler front end 402 that reads the unified input description 302 and translates it into a common internal representation 404. In one embodiment, this compiler front end may be formed by a portions of a compiler that includes scanning and parsing algorithms or subroutines and may be referred to as a scanning and parsing module. As part of this translation process, the input is also checked to meet the rules of how the syntax rules and the interspersed code must be written formally. Any violations are reported as appropriate IR generation error messages 406. For example, a missing ")" would be detected in this step.

The internal representation 404 is a data structure representing all relevant information found in the input file 302. In short, the information stored in the internal representation is a superset of what a compiler for the language the interspersed code is written in would store, and what scanner and parser generator according to prior art would store. To be more precise, the internal representation 404 may reflect the structure of the description for the formal language part of the input, e.g. what elements a regular expression contains, which parts are iterated by what factor, which parts are alternatives of each other, etc. The internal representation 404 may also store information on every attribute used in a grammar rule. The internal representation 404 may also contain declarations etc. found in the programming language. These are represented using some state of the art technology, e.g., some variant of the static single assignment form.

A regular expression checker 408 checks whether the regular expression portion of the common internal representation 404 is correct. Any violations are reported as regular expression errors 410. For example, an iteration factor outside the legal range would be detected during this step.

A context-free expression checker 412 checks whether the context-free portion or the internal representation 404 is correct. Any violations are reported as error messages 414. For example, if the applied grammar class is LL(1) then any violation of an LL(1)-condition would be detected during this step.

A code checker 416 then checks the interspersed code and the usage of attributes for correctness. The code checker uses information stored in the internal representation 404. Any violations are reported as appropriate error messages 418. For attributes, the code checker 416 provides full type checking as it is usually performed for compiler-implemented languages. For interspersed code, the code checker 416 performs all checks that a compiler for the respective language would perform. This checking is only possible because the internal representation 404 provides all necessary information. In particular, the interspersed C code (or other type of code depending on the programming language) occurs in an environment containing all declarations, i.e. in a context where it can be checked for correctness. Also, all attributes used in the formal language part of the input now appear in the context that allows to perform a type check.

In one embodiment, the internal representation 404 is then used an input for a state of the art code optimization and code generation module 420 which results in an executable code 422.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing device that includes hardware configured to operate as a system comprising:
    an input compiler scanning and parsing module that receives a unified input description containing syntax rules for both regular and context-free expressions and interspersed code, the input compiler scanning and parsing module configured to translate the unified input description into a common internal representation, wherein the common internal representation store information on every attribute used in a grammar rule;
    a regular expression checker coupled to the input compiler scanning and parsing module configured to check regular expressions in the common internal representation;
    a context-free expression checker coupled to the regular expression checker configured to check context-free expressions in the common representation;
    a code checker coupled to the context-free expression checker configured to check the interspersed code, wherein the code checker checks the interspersed code and the usage of the attributes for correctness or violations and are reported as error messages; and
    a code optimizer and code generator coupled to the code checker that inputs the interspersed code to create and output an executable compiler program.

2. The system of claim 1, wherein the regular expression checker and the context-free expression checker are coupled between the scanning and parsing module and the code optimizer and code generator.

3. The system of claim 1, wherein the regular expression checker and the context-free expression checker are both configured to create error messages in the event that an error is detected.

4. The system of claim 3, wherein the scanning and parsing module and the checker for the interspersed code are both configured to create error messages in the event that an error is detected.

5. A computing device that includes hardware configured to operate as a system comprising:
    a scanning and parsing module that receives a unified input description containing syntax rules for both regular and context-free expressions and interspersed code, a compiler scanning and parsing module configured to translate the unified input description into a common internal representation, wherein the common internal representation store information on every attribute used in a grammar rule;

a regular expression checker coupled to the compiler scanning and parsing module configured to check regular expressions in the common internal representation;

an expression checker coupled to the scanning and parsing module configured to check expressions in the common internal representation;

a code checker coupled to the expression checker configured to check the interspersed code, wherein the code checker checks the interspersed code and the usage of the attributes for correctness or violations and are reported as error messages; and a code optimizer and code generator coupled to the code checker that inputs the interspersed code to create and output an executable compiler program.

6. The system of claim 5, wherein the expression checker is a regular expression checker configured to check regular expressions.

7. The system of claim 5, wherein the expression checker is a context-free expression checker configured to check context-free expressions.

8. The system of claim 5, wherein the expression checker includes a context-free expression checker configured to check context-free expressions and a regular expression checker configured to check regular expressions.

9. The system of claim 8, wherein the regular expression checker and the context-free expression checker are both configured to create error messages in the event that an error is detected.

* * * * *